United States Patent
Hord et al.

(10) Patent No.: US 9,974,283 B1
(45) Date of Patent: May 22, 2018

(54) COLLAR MOUNTED INTRUDER DETECTION SECURITY SYSTEM

(71) Applicants: Margaret A. Hord, Oakland, MD (US); Benjamin F. Hord, Columbia, MO (US)

(72) Inventors: Margaret A. Hord, Oakland, MD (US); Benjamin F. Hord, Columbia, MO (US)

( * ) Notice: Subject to any disclaimer, the term of this patent is extended or adjusted under 35 U.S.C. 154(b) by 0 days. days.

(21) Appl. No.: 15/346,221

(22) Filed: Nov. 8, 2016

(51) Int. Cl.
| G08B 13/00 | (2006.01) |
| A01K 27/00 | (2006.01) |
| H04R 1/02 | (2006.01) |
| G10L 17/26 | (2013.01) |
| G08B 13/16 | (2006.01) |

(52) U.S. Cl.
CPC ........ *A01K 27/009* (2013.01); *G08B 13/1672* (2013.01); *G10L 17/26* (2013.01); *H04R 1/028* (2013.01)

(58) Field of Classification Search
None
See application file for complete search history.

(56) References Cited

U.S. PATENT DOCUMENTS

| 4,679,034 A * | 7/1987 | Kamada | G08B 13/19 340/529 |
| 5,828,304 A * | 10/1998 | Mowday | G08B 21/082 340/539.1 |
| 5,900,818 A * | 5/1999 | Lemnell | A01K 27/009 340/573.3 |
| 6,067,018 A * | 5/2000 | Skelton | A01K 11/008 119/721 |
| 6,178,923 B1 | 1/2001 | Plotkin | |
| 7,236,880 B2 | 6/2007 | Fager et al. | |
| 7,634,975 B2 | 12/2009 | Kates | |
| 9,743,643 B1 * | 8/2017 | Kaplan | A01K 11/008 |
| 2004/0189477 A1 * | 9/2004 | Hisano | A01K 15/021 340/573.3 |
| 2006/0227640 A1 * | 10/2006 | Herschaft | H04N 7/183 365/207 |
| 2008/0036594 A1 | 2/2008 | Kates | |
| 2008/0236514 A1 | 10/2008 | Johnson et al. | |
| 2008/0309449 A1 * | 12/2008 | Martin | G08B 25/08 340/3.1 |

(Continued)

*Primary Examiner* — Quan-Zhen Wang
*Assistant Examiner* — Chico A Foxx
(74) *Attorney, Agent, or Firm* — Dale J. Ream (57) ABSTRACT

A security system configured to be attached about the neck of a dog, includes a collar having opposed ends, each end having a fastener such that the belt is configured to be selectively coupled about the dog's neck. A monitoring assembly is mounted to the collar, the monitoring assembly including a microphone and a processor in data communication with the microphone. A transmitter is operatively connected to the processor. A response assembly is displaced from the monitoring assembly that includes a speaker in data communication with the processor, the processor configured to selectively actuate the speaker when the processor determines that the microphone has detected a predetermined sound, such as the bark of an intruding dog. The displaced speaker may then emit the sound of a menacing guard dog until the sound of an intruding dog is no longer detected.

6 Claims, 6 Drawing Sheets

(56) References Cited

U.S. PATENT DOCUMENTS

| | | | | |
|---|---|---|---|---|
| 2009/0033505 A1* | 2/2009 | Jones | .................... | G08B 25/009 340/584 |
| 2012/0188081 A1* | 7/2012 | Van Katwijk | ........... | G01S 13/56 340/541 |
| 2012/0293329 A1* | 11/2012 | Cunningham | ..... | G08B 13/1672 340/566 |
| 2014/0020635 A1* | 1/2014 | Sayers | ................. | A01K 15/021 119/721 |
| 2014/0074481 A1* | 3/2014 | Newman | ................. | G10L 25/51 704/275 |
| 2014/0118140 A1 | 5/2014 | Amis | | |
| 2015/0053144 A1* | 2/2015 | Bianchi | ................ | A01K 27/001 119/720 |
| 2015/0342150 A1* | 12/2015 | Womble | ............... | A01K 27/009 119/718 |
| 2016/0015005 A1* | 1/2016 | Brown, Jr. | ........... | A01K 29/005 340/573.3 |
| 2016/0302392 A1* | 10/2016 | Pantazes | ............. | A01K 29/005 |
| 2016/0366857 A1* | 12/2016 | Polk | .................... | A01K 27/009 |
| 2017/0103641 A1* | 4/2017 | Martin | ................... | G08B 25/14 |
| 2017/0265432 A1* | 9/2017 | Anderton | ............. | A01K 15/023 |

\* cited by examiner

COLLAR MOUNTED INTRUDER DETECTION SECURITY SYSTEM

BACKGROUND OF THE INVENTION

This invention relates generally to intruder detection systems and, more particularly, to an intruder detection system having a monitoring assembly mounted to a dog collar about a pet's neck configured to detect sounds indicative of an intruder and having a response system situated remote from the monitoring assembly for emitting sounds intended to intimidate and scare away an intruder.

Intruder detection devices are well known in the art, such as basic motion sensors that, when triggered, cause lights to illuminate a predetermined area. For instance, one or more motion detectors may be mounted proximate a house, garage, or commercial business and configured to energize one or more spot lights if movement within a predetermined area is detected. However, when the intruder is a rodent, dog, or non-human intruder, lights alone are ineffective to intimidate or scare away the intruder.

Similarly, a residence at which a pet dog is present in an outdoor environment might not be able to intimidate and scare away an intruder either. For instance, if an unrestrained dog wanders onto the property, a small dog's yips and squeaky barks are unlikely to scare away the more menacing animal or a human intruder. By contrast, a more menacing sounding guard dog would be more effective at urging the intruder to leave quickly and not return.

Therefore, it would be desirable to have an intruder detection system mounted to a domestic animal's neck collar which, when an intruder is detected, activates a remotely positioned speaker to emit menacing "guard dog" barking so as to scare away the intruder.

SUMMARY OF THE INVENTION

A security system for detecting an intruder proximate a dog in an outdoor environment according to the present invention and configured to be attached about the neck of a dog includes a collar having opposed ends, each end having a fastener such that the belt is configured to be selectively coupled about the dog's neck. A monitoring assembly is mounted to the collar, the monitoring assembly including a microphone and a processor in data communication with the microphone. A transmitter is operatively connected to the processor. A response assembly is displaced from the monitoring assembly that includes a speaker in data communication with the processor, the processor configured to selectively actuate the speaker when the processor determines that the microphone has detected a predetermined sound, such as the bark of an intruding dog. The displaced speaker may then emit the sound of a menacing guard dog until the sound of an intruding dog is no longer detected.

Therefore, a general object of this invention is to provide an intruder detection system mounted to a domestic animal's neck collar which detects sounds via a microphone that are indicative of an intruder.

Another object of this invention is to provide an intruder detection system, as aforesaid, that activates a remotely positioned speaker to emit menacing "guard dog" barking so as to scare away the intruder.

A further object of this invention is to provide an intruder detection system, as aforesaid, that deactivates the remote speaker once the monitoring assembly no longer detects the presence of an intruder.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3a is an isolated front view of a casing removed from the monitoring assembly as in FIG. 1;

FIG. 3b is a sectional view taken along line 3b-3b of FIG. 3a;

FIG. 4b is a sectional view taken along line 4b-4b of FIG. 4a;

DESCRIPTION OF THE PREFERRED EMBODIMENT

A security system for detecting an intruder proximate a dog will now be described in detail with reference to FIGS. 1 to 6 of the accompanying drawings. The security system 10 includes a collar 20, a monitoring assembly 30 coupled to the collar 20, and a response assembly 50 displaced and remote from the monitoring assembly 30.

Figure 1:
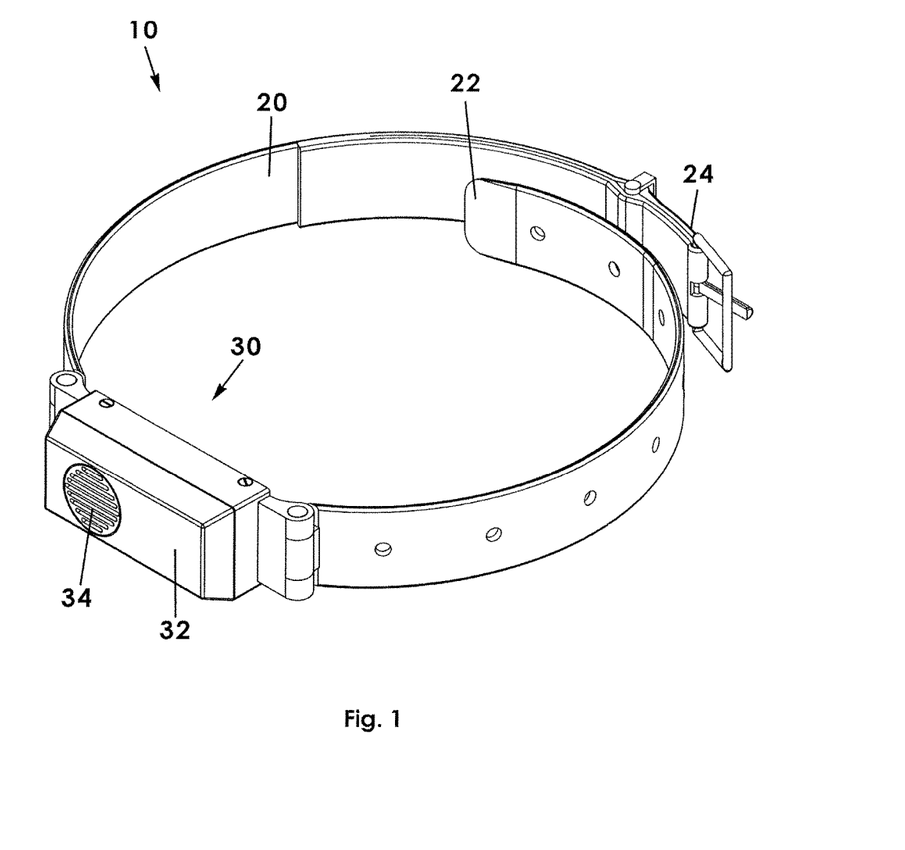
FIG. 1 is a perspective view of a monitoring assembly of a collar mounted security system according to a preferred embodiment of the present invention.
Figure 2:
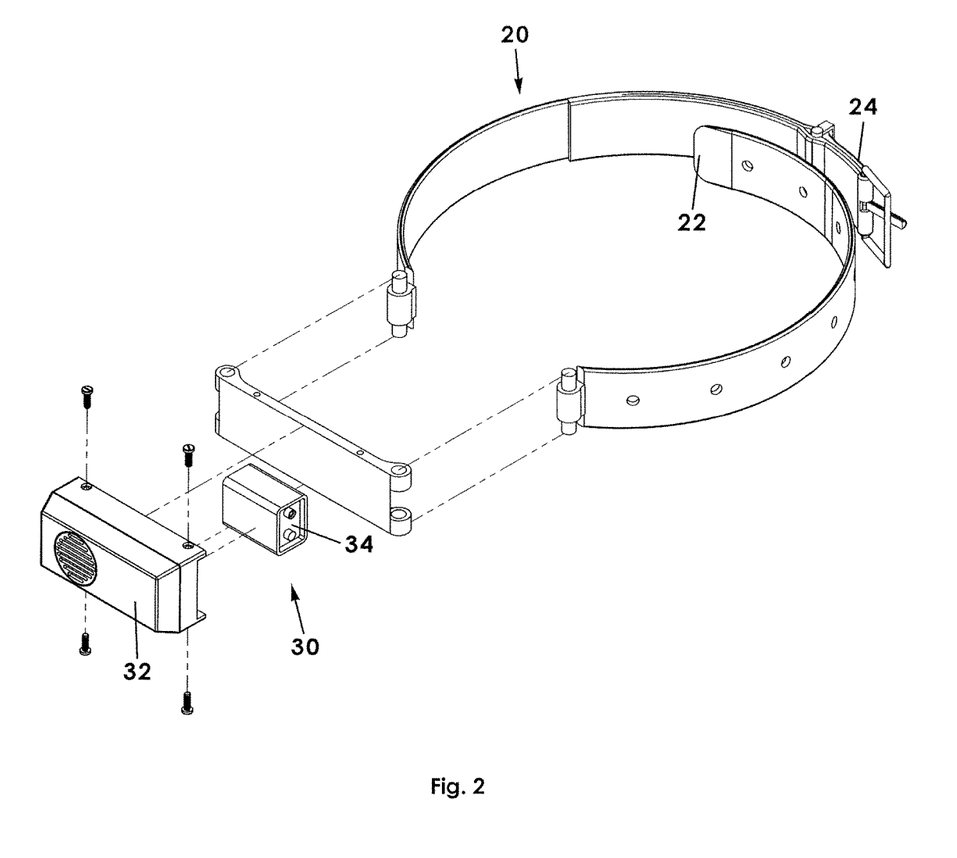
FIG. 2 is an exploded view of the monitoring assembly as in FIG. 1.
Figures 3A, 3B:
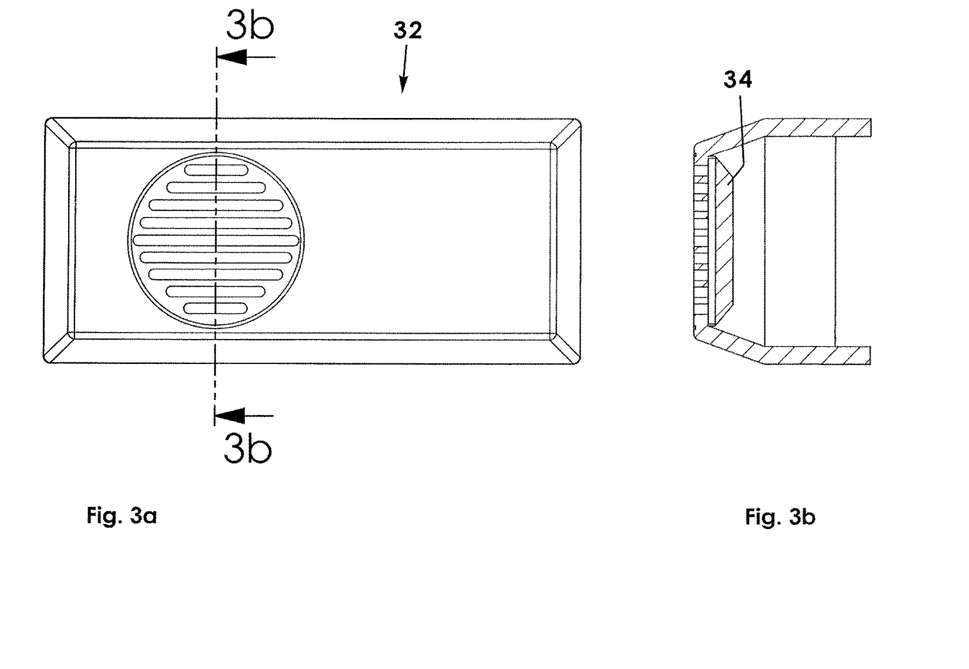
Figure 4A:
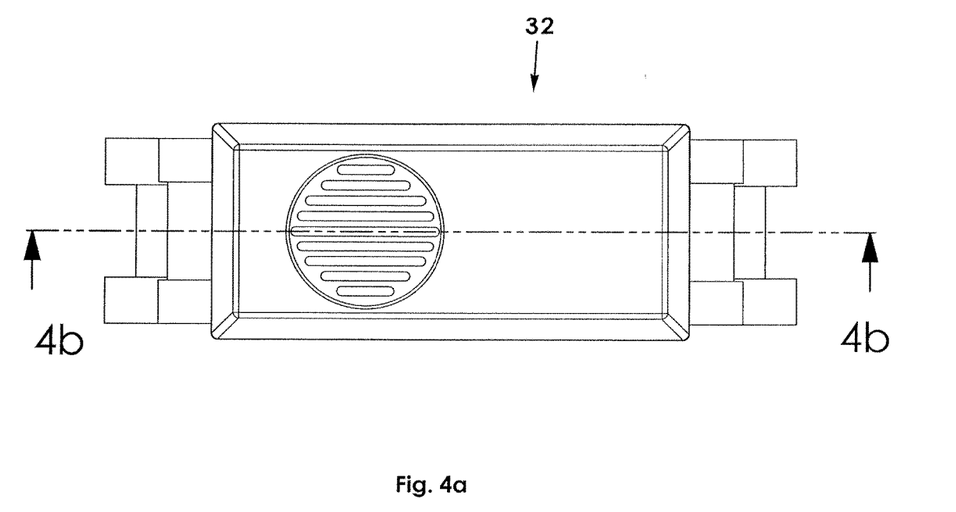
FIG. 4a is another isolated front view of a casing removed from the monitoring assembly as in FIG. 1.
Figure 4B:
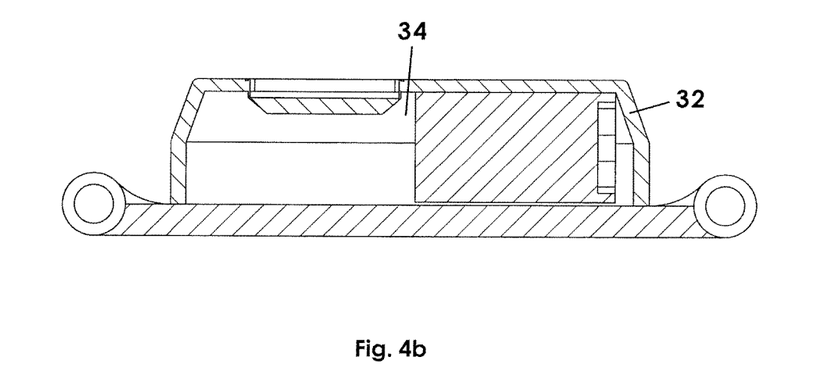

The collar 20 of the security system 10 includes an elongate and generally rectangular configuration having opposed ends 22, 24. Fasteners mounted at respective ends of the collar 20 are configured to be selectively fastened together, such as about the neck of a pet—preferably of a dog in the present instance. The body of the dog collar 20 may include length adjustment elements, such as a pin and holes combination, clips, clasps, hook and loop fasteners, snaps, buckles, or other fastener combinations.

The monitoring assembly 30 may include a casing 32 coupled to the collar 20, such as to the front or neck-side of the collar 20, the casing 32 having a single continuous wall or multiple walls that define an interior area. The monitoring assembly 30 may include a microphone 34 positioned in the interior area and in operative communication with a front side thereof. In other words, the casing 32 may include one or more apertures that enhance the microphone's performance in receiving ambient sound (FIG. 1).

Further, the monitoring assembly 30 may include a processor 36 or equivalent circuitry positioned in the interior area of the casing 32. A non-volatile memory 38 may also be positioned in the casing and in data communication with the processor 36, the memory 38 being electronically configured to include programming and data structures. Data stored in memory 38 may include sound data indicative of the sound of a viscous guard dog as well as other sounds to be emitted by a speaker 52 as will be discussed further later. In addition, the response assembly 50 may include a battery 40 electrically connected to the electronic components in the casing 32.

In use, the microphone 34 is configured to receive a sound and deliver the received sound digitally to the processor 36. The processor 36, under program control, is configured to determine if the microphone 34 has received (i.e. detected) a predetermined sound judged to be indicative of the presence of an intruder. For instance, the processor 36 is configured to determine if a received sound is indicative of a dog barking, a person talking, etc.

Figure 5:
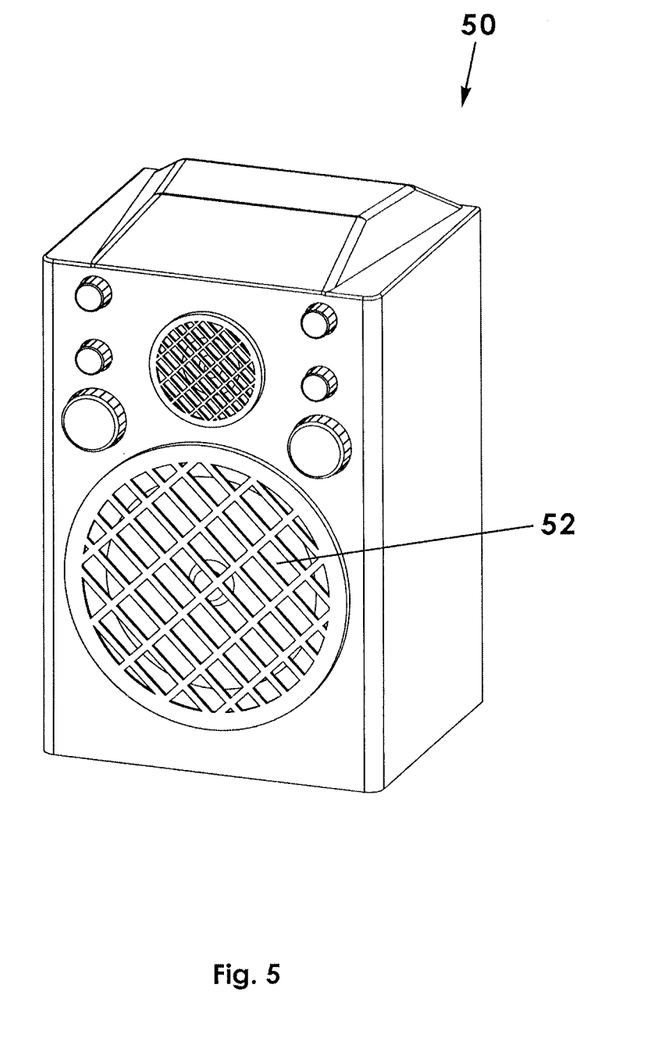
FIG. 5 is a perspective view of a response assembly of the collar mounted security system according to the present invention.

The response assembly 50 is a module remote or displaced from the collar 20 and monitoring assembly 30. For instance, the response assembly may include a housing mounted on an exterior wall of a residence, positioned in a yard or patio, or otherwise positioned where its speaker 52 is most effectively heard by an intruder. Accordingly, the response assembly 50 includes at least a speaker 52 and a receiver 54 in electrical and data communication with the speaker 52. Preferably, the speaker 52 is a high performance and sizeable construction so as to produce a high quality and realistic sounding emission. In an embodiment, the response assembly 50 may include its own processor, memory, transmitter, and battery (not shown) or equivalent circuitry for controlling the speaker 52.

Figure 6:
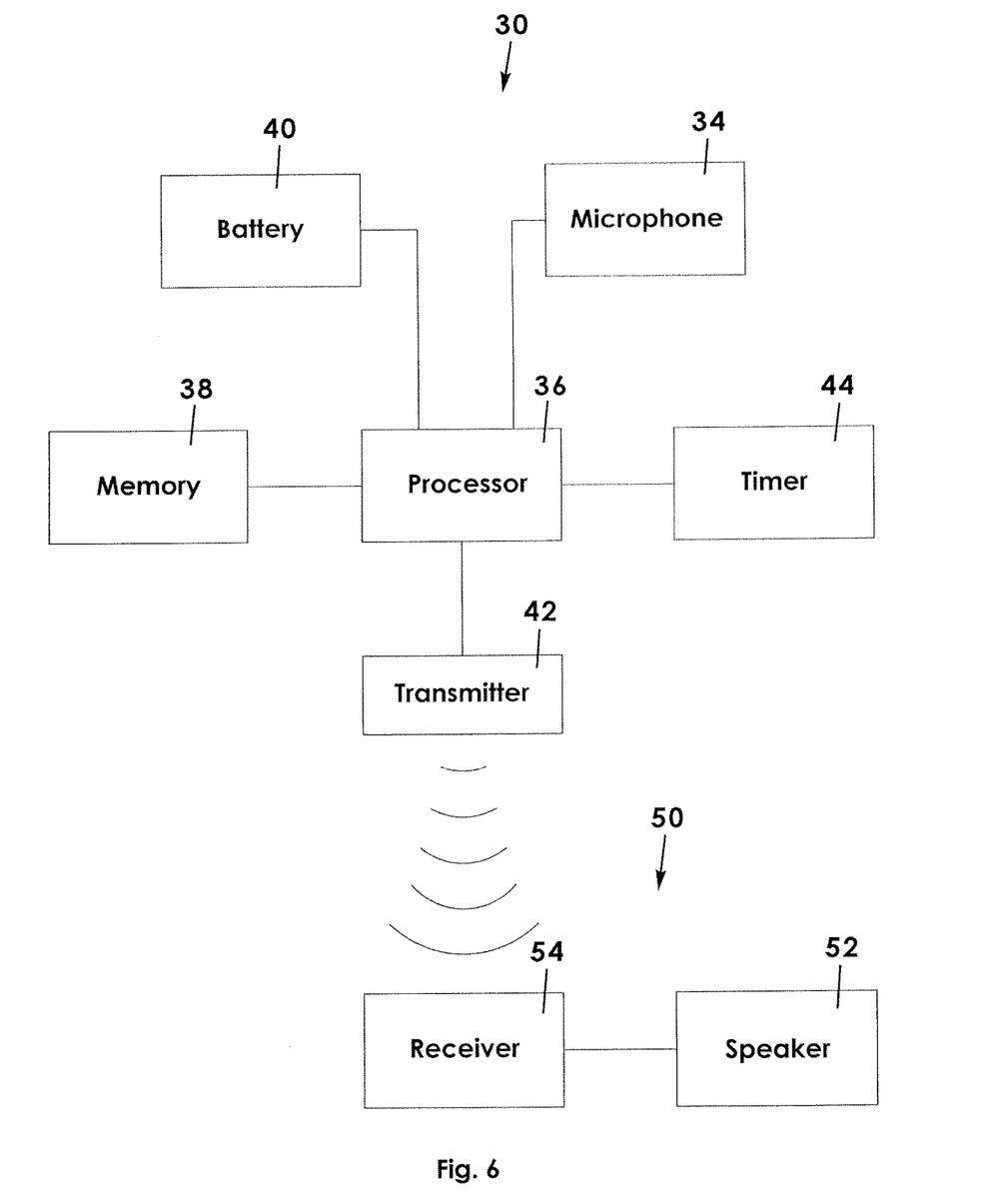
FIG. 6 is a block diagram of the electronic components of the security system according to the present invention.

The monitoring assembly 30 of the security system 10 may include a transmitter 42 in data communication with the processor 36 and is configured to transmit actuation and data signals into the ambient air. Under program control, the processor 36, when appropriate, causes the transmitter 42 to send a signal actuating the speaker 52 to emit predetermined sounds, e.g. barking sounds of a guard dog. More particularly, the processor 36 is configured to cause the transmitter 42 to transmit sound data in signals, the sound data having been stored in memory 38. The receiver 54 of the response assembly 50 is configured to receive the sound data signals and to communicate them to the speaker 52 for emission thereby.

The security system 10 is configured to stop the speaker 52 from emitting a dog barking sound once the microphone 34 is no longer receiving or detecting the predetermined sound identifiable as a potential intruder (whether dog or person). Specifically, the processor 36, under program control, continuously monitors the microphone 34 and, when the predetermined sound is no longer detected, causes the transmitter 42 to send a "stop signal" which, when received by the receiver, deactivates the speaker 52.

In another aspect, the sound data being emitted by the speaker 52 is permitted to continue for a predetermined amount of time after the threat or presence of an intruder has ceased. More particularly, the monitoring assembly 30 may include a timer 44, such as in the form of a circuit, in data communication with the processor 36. There is programming that, first, causes the processor 36 to determine if the microphone 34 is no longer receiving the predetermined sound. If so, the timer 44 is energized to count or cycle for a predetermined amount of time. In other words, a delay is initiated. Once the time has expired, programming causes the processor 36 to initiate the stop signal to deactivate the speaker 52 as described above.

In use, the security system 10 is able to detect the proximate presence of an intruder, such as a dog. Specifically, the microphone 34 of the monitoring assembly 30 is configured to detect ambient sound and, in cooperation with the processor 36 is able to detect a predetermined sound. Once detected, the monitoring assembly 30 (via the processor 36 and transmitter 42) signals the response assembly 50 and speaker 52 to emit predetermined sounds, namely that of a menacing dog likely to intimidate or scare away the intruder. The speaker 52 is deactivated once the microphone 34 no longer detects the predetermined sound.

It is understood that while certain forms of this invention have been illustrated and described, it is not limited thereto except insofar as such limitations are included in the following claims and allowable functional equivalents thereof.

The invention claimed is:

1. A security system for detecting an intruder proximate a dog in an outdoor environment, comprising:
   a collar having opposed ends, each end having a fastener such that said belt is configured to be selectively coupled about the dog's neck;
   a monitoring assembly mounted to said collar, comprising:
      a microphone;
      a processor in data communication with said microphone; and
   a response assembly displaced from said monitoring assembly that includes a speaker in data communication with said processor, said processor configured to selectively actuate said speaker;
   wherein said processor is configured to actuate said speaker when said microphone detects a predetermined sound;
   a transmitter in data communication with said processor and configured to transmit actuation and data signals;
   programming that, when executed by said processor, causes said processor to actuate said transmitter to transmit respective actuation and data signals; and
   a receiver in data communication with said speaker and configured to receive said actuation and data signals from said transmitter, said receiver configured to cause said speaker to emit sound according to said received signals
   a timer in data communication with said processor;
   programming that, when executed by said processor, causes said processor to:
      determine if said microphone no longer detects said predetermined sound after having previously detected said predetermined sound;
      if no predetermined sound is detected, actuate said timer to cycle a predetermined time;
      upon expiration of said timer cycle, actuate said transmitter to transmit a stop signal;
   wherein said receiver is configured to deactivate said speaker upon receiving said stop signal.

2. The security system as in claim 1, wherein said monitoring assembly includes:
   a non-volatile memory in data communication with said processor that is configured to store programming and sound data;
   a battery in data communication with said processor and said memory;
   a casing mounted to said collar that defines an interior area, said processor, said memory, said microphone, and said battery being situated in said interior area.

3. The security system as in claim 1, wherein said data signals include sound data indicative of a guard dog.

4. The security system as in claim 1, wherein said memory includes a plurality of data signals associated with sounds to be selectively emitted by said speaker.

5. A security system for detecting an intruder proximate a dog in an outdoor environment, comprising:
   a collar having opposed ends, each end having a fastener such that said belt is configured to be selectively coupled about the dog's neck;

a monitoring assembly mounted to said collar, comprising:
   a microphone;
   a processor in data communication with said microphone;
   a non-volatile memory in data communication with said processor that is configured to store programming and sound data;
   a battery in data communication with said processor and said memory;
a response assembly displaced from said monitoring assembly that includes a speaker in data communication with said processor, said processor configured to selectively actuate said speaker; and
programming that, when executed by said processor, causes said processor to determine whether sound detected by said microphone is indicative of a dog barking and, if so, to actuate said speaker;
a transmitter in data communication with said processor and configured to transmit actuation and data signals;
programming that, when executed by said processor, causes said processor to actuate said transmitter to transmit respective actuation and data signals; and a receiver in data communication with said speaker and configured to receive said actuation and data signals from said transmitter, said receiver configured to cause said speaker to emit sound according to said received signals
a timer in data communication with said processor;
programming that, when executed by said processor, causes said processor to:
   determine if said microphone no longer detects said predetermined sound after having previously detected said predetermined sound;
   if no predetermined sound is detected, then actuate said timer to cycle a predetermined time;
   upon expiration of said timer cycle, actuate said transmitter to transmit a stop signal;
wherein said receiver is configured to deactivate said speaker upon receiving said stop signal.

6. The security system as in claim 5, wherein said memory includes a plurality of data signals associated with sounds to be selectively emitted by said speaker.

* * * * *